J. B. & A. LUKOMSKI.
PIPE COUPLING.
APPLICATION FILED AUG. 3, 1914.

1,176,842.

Patented Mar. 28, 1916.

Witnesses
Chas. W. Stauffiger
Anna M. Dorr

Inventors
John B. Lukomski
Anthony Lukomski
By
Attorneys

UNITED STATES PATENT OFFICE.

JOHN B. LUKOMSKI AND ANTHONY LUKOMSKI, OF DETROIT, MICHIGAN.

PIPE-COUPLING.

1,176,842.

Specification of Letters Patent.

Patented Mar. 28, 1916.

Application filed August 3, 1914. Serial No. 854,886.

*To all whom it may concern:*

Be it known that we, JOHN B. LUKOMSKI and ANTHONY LUKOMSKI, citizens of the United States of America, residing at Detroit, in the county of Wayne and State of Michigan, have invented certain new and useful Improvements in Pipe-Couplings, of which the following is a specification, reference being had therein to the accompanying drawings.

This invention relates to a pipe coupling, and the objects of our invention are, first, to provide a simple connection by which a lead pipe can be placed in communication with a wrought iron pipe; second, to provide a connection with a novel socket in which the ends of the lead pipe can be firmly secured to form a non-leakable connection, and third, to provide a simple, durable and inexpensive coupling that permits of a plumber or other artisan expeditiously connecting a lead or soft metal pipe to a wrought iron pipe or similar conduit.

We attain the above and other results by a mechanical construction that will be hereinafter specifically described and then claimed, and reference will now be had to the drawings wherein—

Figure 1:
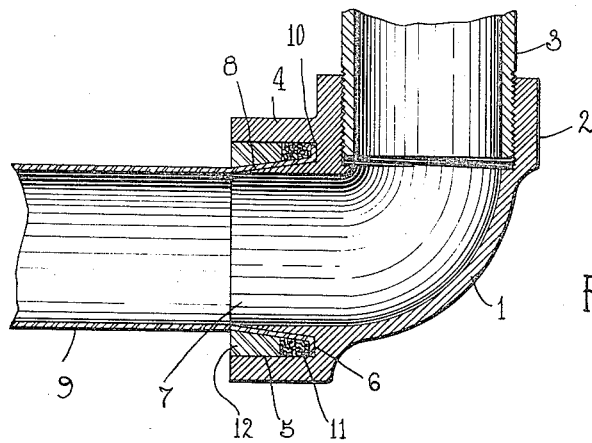
Figure 2:
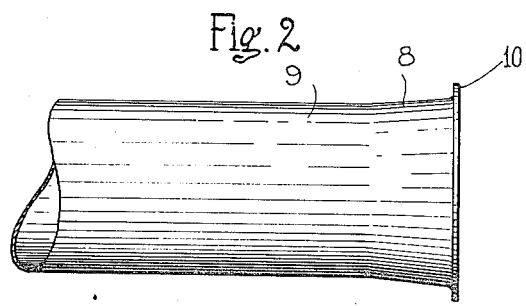
Figure 3:
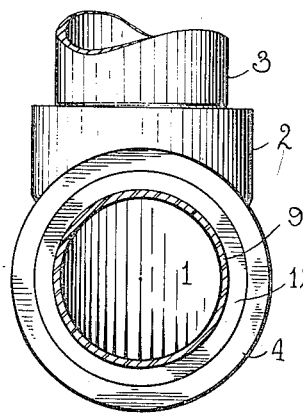

Figure 1 is a longitudinal sectional view of the pipe coupling; Fig. 2 is a side elevation of the end of a lead pipe, and Fig. 3 is an end view of the coupling shown in Fig. 1.

In the drawings, 1 denotes by the way of an example, an elbow or conduit member having one end thereof provided with an interiorly screwthreaded collar or enlargement 2 adapted to receive the exteriorly screwthreaded end of a wrought iron pipe 3. The opposite end of the elbow 1 has a collar or enlargement 4 of greater diameter than the collar or enlargement 2 and the said collar 4 has an annular socket or groove 5 approximately the depth of said collar. The outer wall of the groove or socket 5 is in parallelism with the periphery of the collar 4, and the inner wall of said socket or groove is tapered from the inner end of the collar outwardly. These two walls terminate at a wall 6 forming the bottom of the socket or groove, said bottom wall 6 being in a plane parallel with the longitudinal axis of the collar 2. The tapered inner wall of the socket or groove 5 coöperates with the inner wall of the collar 4 in providing an annular flange 7 within the end of the collar 4 and it is against the tapered wall of said flange that the flared end 8 of the lead pipe 9 is secured. The flared end 8 of the pipe 9 is upset or reamed to provide an annular flange 10 disposed at right angles to the longitudinal axis of the pipe 9. The flange 10 corresponds in depth to the bottom wall 6 of the socket or groove, whereby the said flange will abut the bottom wall, and to retain the flared and flanged end of the lead pipe within the socket or groove, oakum 11 or other packing is tamped in the socket or groove against the flange 10 of the pipe 9. The oakum or packing occupies approximately one half of the socket or groove and the other half of said socket or groove receives a metallic seal 12, preferably in the form of lead which is poured into the socket or groove when in a molten condition. The metallic seal adheres to the walls of the pipe 9 and the collar 4 and prevents the pipe 9 from becoming accidentally displaced. The metallic seal coöperates with the packing in retaining the flared portion of the pipe 9 in sliding engagement with the tapering flange 7 of the collar, and we attach considerable importance to this flange since it tends to expand the flared end of the lead pipe as said pipe is seated within the socket or groove. The tapering flange 7 also prevents the flared and flanged end of the pipe from being split or injured while placing the packing in the groove. The flange 7 is tapered to a feather edge and affords unobstructed flow between the pipe 9 and the elbow 1.

It is to be understood that the connection is applicable to T's and other connections used in the art of plumbing, and while one embodiment of the invention has been illustrated, it is to be understood that the structural elements are susceptible to such variations and modifications as fall within the scope of the appended claim.

What we claim is:—

A pipe coupling comprising an elbow having collars at the ends thereof with one of said collars of greater diameter than the other and formed with an annular groove, said groove having the inner wall thereof tapered inwardly to form a featheredge in the plane of the outer end of said collar, a pipe having an inner diameter corresponding to the inner diameter of the tapered wall of said groove, said pipe having a flared, flanged end with the flared portion embracing the tapered wall of said groove, the flanged portion thereof fitted against the flat bottom of the groove, a packing in said groove on the tapered and flanged portions of said pipe, and a metallic seal on said packing around the tapered portion of said pipe and flush with the outer end of said collar, said seal binding the tapered portion of said pipe against the featheredge of the tapering collar wall to form an uninterrupted passage from said pipe into said elbow.

In testimony whereof we affix our signatures in presence of two witnesses.

JOHN B. LUKOMSKI.
ANTHONY LUKOMSKI.

Witnesses:
ANNA M. DORR,
KARL H. BUTLER.